United States Patent Office 2,984,252
Patented May 16, 1961

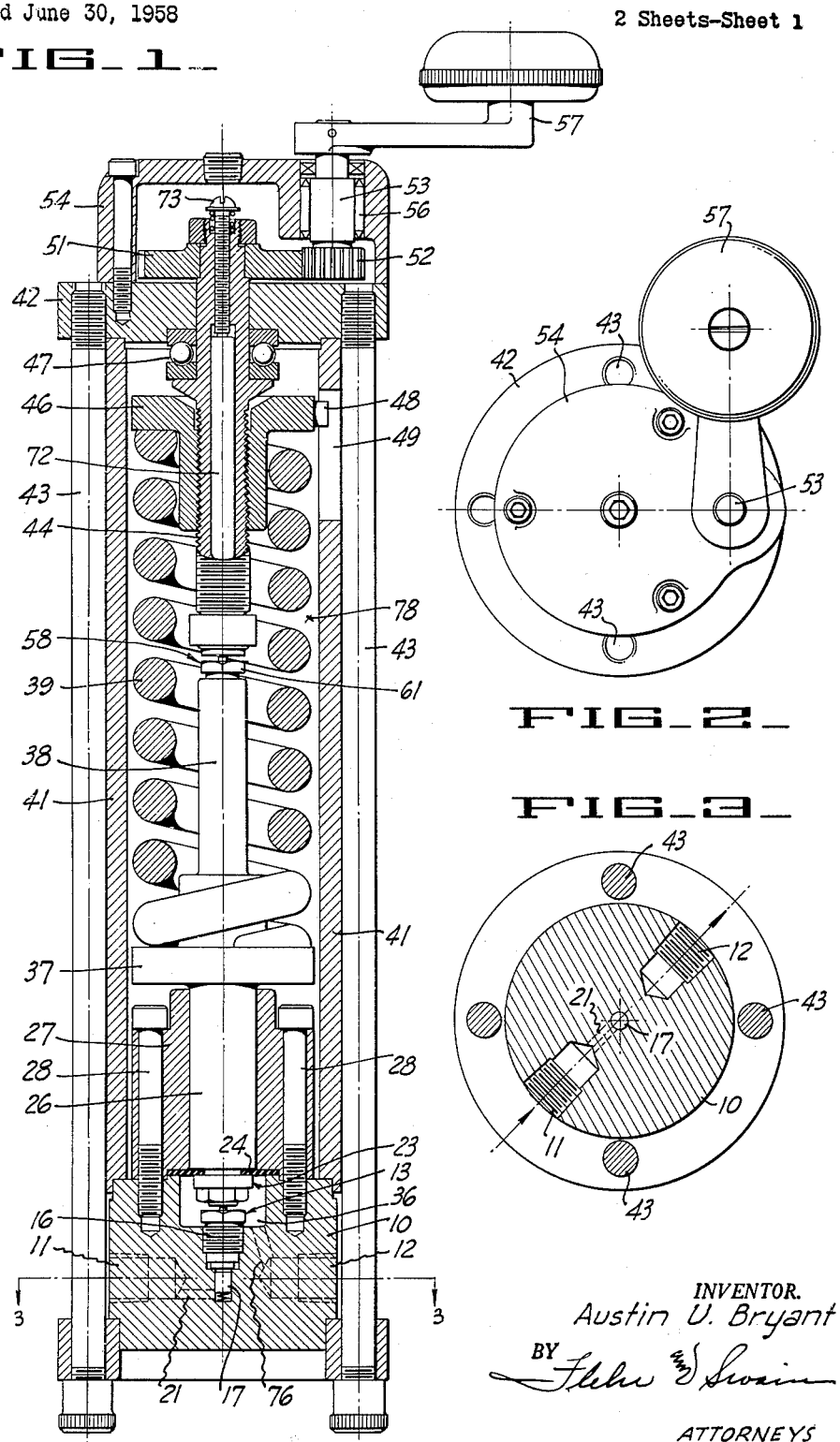

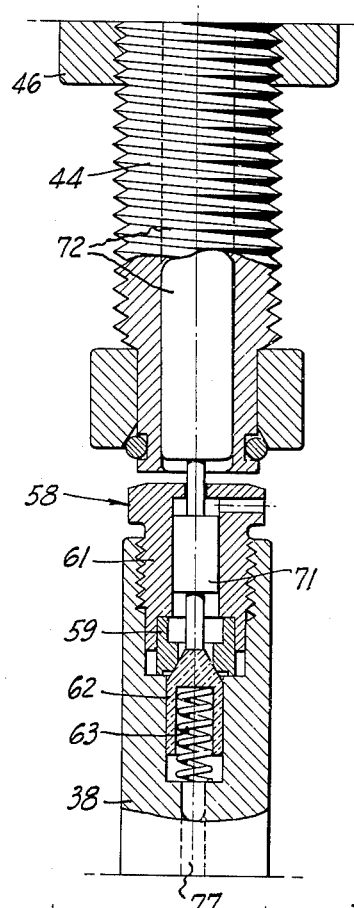
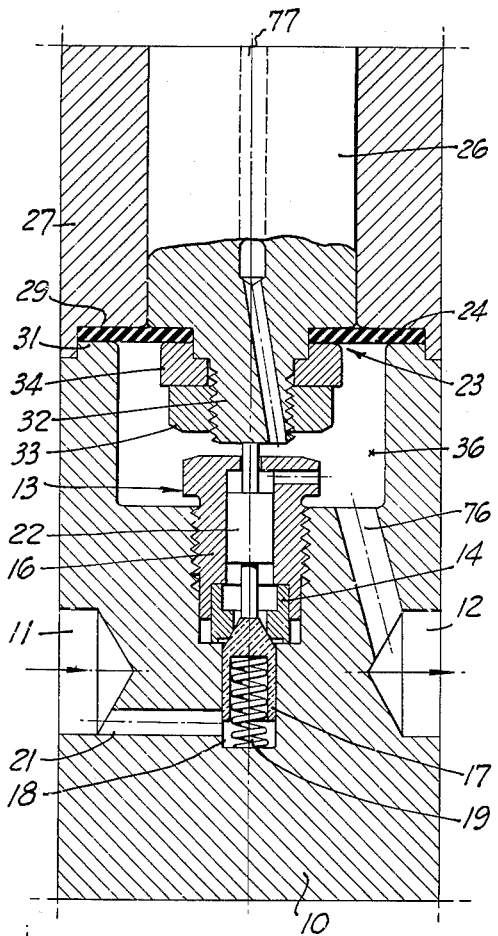
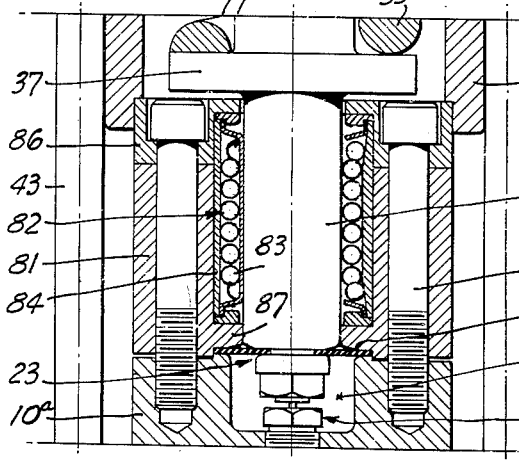

2,984,252

FLUID PRESSURE REGULATOR

Austin U. Bryant, Walnut Creek, Calif., assignor to Grove Valve and Regulator Company, Oakland, Calif., a corporation of California Filed June 30, 1958, Ser. No. 745,380

1 Claim. (Cl. 137—116.5)

This invention relates generally to apparatus for regulating the flow of various fluids. More particularly it pertains to regulating devices capable of maintaining a desired gas pressure in a fluid pressure system.

In Patent 2,342,659, there is shown a small capacity regulator capable of adjustment over a wide range of outlet pressures, and incorporating both pressure reducing and pressure relief means. When such devices are used for the higher operating pressure ranges, certain problems are involved, particularly when it is desired to maintain the regulation relatively accurate. Assuming the use of a diaphragm assembly with spring loading, the assembly must be constructed to provide a predetermined fluid pressure area, with a minimum amount of variation of this area when the diaphragm moves under the control of differential fluid pressures. This requirement becomes more critical as the diaphragm is reduced in effective fluid pressure area, to permit maintenance of outlet pressures in the higher pressure ranges. As the effective fluid pressure area is reduced, there is a corresponding increase in the problems involved in providing proper loading, and in imparting movements to the pressure reducing and relief valve means in such a manner as to provide effective uniform pressure regulation.

In general it is an object of the present invention to provide an improved spring loaded regulating device capable of operating in the higher pressure ranges.

Another object of the invention is to provide a mechanical construction whereby the flexible portion of the diaphragm assembly is effectively supported against applied differential pressure, and in which erratic action, due to improper diaphragm movements, is eliminated.

Another object of the invention is to provide a regulating device having improved means for transmitting the force of the loading spring to the diaphragm assembly.

Additional objects and features of the invention will appear from the following description in which the preferred embodiment has been set forth in detail in conjunction with the accompanying drawing.

Referring to the drawing:

Figure 1 is a side elevational view in section illustrating a regulating device incorporating the present invention.

Figure 2 is an end view of the device, looking toward the upper end of Figure 1.

Figure 3 is a cross sectional view taken along the line 3—3 of Figure 1.

Figure 4 is an enlarged detail in section showing the relief valve means and associated parts.

Figure 5 is an enlarged detail in section showing the reducing valve means and associated parts.

Figure 6 is a detail in cross section showing a modified form of guide means.

The regulating device illustrated in the drawing consists of a body part 10 provided with the inlet and outlet passages 11 and 12. The inlet passage is adapted for connection with a source of high pressure air or other gas, such as one or more pressure flasks or tanks. The outlet passage 12 is adapted for connection with a pressure system which may be maintained at a relative high pressure value, but lower than the high pressure side. This lower pressure system may be either closed, or it may be such that gas is admitted or discharged from the same.

The interior of the body serves to mount the pressure reducing valve means 13. This valve means can consist of a seat ring 14, held in place by the threaded retainer 16. A valve member 17 is loosely disposed within the bore 18, and is urged toward closed position with respect to the seat ring 14 by a compression spring 19. Duct 21 connects inlet passage 11 with one end of the bore 18.

The retainer 16 loosely accommodates the thrust pin 22, which is adapted to be moved to dislodge the valve member 17 from its seat. The diaphragm assembly 23, which serves to operate the reducing valve means 13, consists of a flexible diaphragm element 24, together with a piston-like rod 26. The rod 26 is slidably fitted within a guide member 27 that is mounted upon one end of the body 10 by suitable means such as the screws 28. A peripheral margin of the flexible diaphragm element 24 is tightly clamped between the annular shoulder 29 on the member 27, and the annular shoulder 31 on the body part 10. A threaded stud 32 extends from one end of the rod 26 through the flexible diaphragm element, and is engaged by the nut 33, whereby the washer 34 is caused to tightly clamp the inner margin of the flexible diaphragm element against the lower end of the rod 26.

With the diaphragm assembly construction described above, the effective fluid pressure area presented to pressure in the space 36 is substantially equal to the cross sectional area of the rod 26 and the bore in which it operates.

Above the guide member 27, the rod 26 is provided with the flange or collar 37, and it is extended to form the stem 38. Collar 37 serves to seat one end of the loading spring 39.

A tubular shell 41 serves to enclose the loading spring 39 and associated parts, and has its one end seated upon the body part 10. An end plate 42 is seated upon the other end of the shell 41, and the assembly comprising the body 10, the shell 41 and the end plate 42, is held together by the tie rods 43.

A hollow shaft 44 extends through the end plate 42 and is aligned with the spring 39. This shaft is threaded and is engaged by the threaded seating member 46, which serves to seat the other end of the spring 39. A suitable thrust bearing assembly 47, as for example, one of the ball bearing type, is interposed between the hollow shaft and the end plate 42, whereby this shaft can be rotated with a minimum amount of friction. Roller 48 on the seating member 46 engages within a slot 49 in the shell 41, to hold the seating member against rotation while the shaft is being turned.

Suitable means connects with the exterior end of the shaft 44 to turn the same to adjust the device to different outlet pressures. The operating means illustrated consists of a gear 51 attached to the upper end of the shaft, and engaging a pinion 52 carried by the shaft 53. These parts are enclosed by a housing 54. A suitable bearing assembly 56 serves to journal the shaft 53. The operating handle 57 is attached to the exterior end of the shaft 53 for manual operation. In some instances shaft 53 may connect with suitable motive means, such as a remote operated reversible electrical motor.

The upper end of the stem 38 carries relief valve means 58. This means can consist of a seat ring 59 held in place by the retainer 61. Valve member 62 is loosely accommodated within a bore provided in the stem 38, and is urged towards closed position by the compression spring 63. Retainer 61 loosely accommodates the thrust pin 71, and one end of this pin engages the valve member 62 and the other end engages the adjustable rod 72. The hollow shaft 44 has a central opening to accommodate the rod 72, and the end of this rod nearest the plate 42 engages an adjustable abutment formed by the screw 73.

Gas flowing through the valve means 13 is delivered to the outlet 12 through the duct 76. The rod 26 and stem 38 are provided with the duct 77, whereby gas may flow from the space 36 through this duct to the relief valve means 58. Gas vented through the relief valve means discharges into the space 78, which is open to the atmosphere.

Operation of the regulating device described above is as follows: The inlet passage 11 is connected to a high pressure source, as, for example, one or more flasks or tanks containing gas under pressure. This pressure may, for example, be of a value within the range of from 5,000 to 10,000 p.s.i. Outlet passage 12 is connected to a lower pressure system, which, as previously mentioned, may be closed, or may be such that gas is removed from or supplied to the same. Assuming a static condition in which the outlet pressure is being maintained at a desired value, without flow of gas, both the pressure reducing and the relief valve means are closed. Outlet pressure within the space 36 balances the force of the loading spring. When gas is consumed from the outlet side, thus tending to reduce the outlet pressure, the valve assembly moves in a direction to open the valve member 17, with the result that gas is supplied to the outlet from the high pressure side, thus restoring the outlet pressure. If the pressure on the outlet side should build up to a value beyond that desired, then the diaphragm assembly is moved in the opposite direction whereby the relief valve 62 is opened, thus causing gas to be vented from the outlet side to the atmosphere.

It will be evident from the foregoing that my regulator has a number of desirable features. The flexible element 24 of the diaphragm assembly is well supported at all times against differential pressure, and at the same time the effective fluid pressure area remains substantially constant. The manner in which the rod 26 is guided prevents cocking of the diaphragm or other erratic movements tending to cause loss of accuracy. The construction makes it possible to use relatively strong loading springs, such as are required for high pressure applicaitons.

In some instances it may not be necessary or desirable to provide pressure relief valve means 58. For such applications, rod 72 can be retracted to an inactive position, or the valve means 58 and rod 72 can be omitted in entirety.

The modified form of guide means shown in Figure 6 consists of a member 81 that is mounted upon 10a in the same general manner as the previously described embodiment. The interior of member 81 is bored to accommodate the ball bearing assembly 82. The assembly can be one designed for rectilinear movement and may include the usual bearing balls 83 and retainer 84. It may be of the type made by Thompson Industries, Inc. (e.g. Catalogue No. A–122026) and termed a "ball bushing." Such an assembly is held in place by the cap 86. That portion 87 of the member 81 provides a flat surface for contacting the diaphragm 24, and is bored to accommodate the adjacent end portion of the rod 26. This embodiment operates in the same manner as the first described embodiment, except that the ball bearing arrangement tends to reduce friction.

I claim:

In a fluid pressure regulating device, a body having inlet and outlet passages, a flexible diaphragm element carried by the body, the body providing a closed fluid chamber on one side of the diaphragm element that is in communication with the outlet passage, pressure reducing valve means biased to a closed position to control flow of fluid from the inlet to the otulet passage, a rigid guide member of substantial axial length mounted upon the other side of the diaphragm element, said guide member having a bore extending through the same which is concentric with and perpendicular to the general plane of the diaphragm element, said bore having a length substantially greater than its diameter, said guide member having that end of the same adjacent to the diaphragm element forming a flat annular surface for engaging the annular portion of the diaphragm element which extends outwardly from said bore, a piston-like rod slidably fitted within the guide member, one end of said rod forming an area engaging the diaphragm element in a plane corresponding generally to the plane of said annular surface, a coiled compression spring for applying loading force to the piston-like rod to move said pressure reducing valve means in a direction to overcome its closing bias with a predetermined force whereby the pressure in said closed fluid chamber on the outlet passage is maintained substantially constant, said piston-like rod including a stemlike extension disposed axially within the coiled loading spring, relief valve means carried by the free end of said extension, the interfitting relationship of the piston-like rod with said guide member serving as means to retain the free end of the stem against lateral movement, and a collar carried by the rod adjacent that end of the guide member remote from the diaphragm element, said coiled compression spring having one end thereof seated upon said collar.

References Cited in the file of this patent

UNITED STATES PATENTS

| | | |
|---|---|---|
| 510,635 | Duval | Dec. 12, 1893 |
| 2,342,659 | Grove et al. | Feb. 29, 1944 |
| 2,663,121 | Ramsey | Dec. 22, 1953 |
| 2,664,674 | Niesemann | Jan. 5, 1954 |
| 2,731,975 | Boals | Jan. 24, 1956 |